Figures 1, 2:
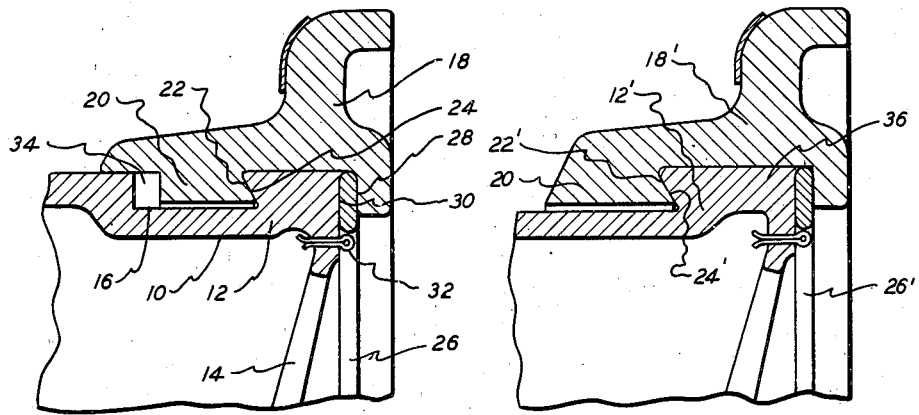

Aug. 9, 1949.　　　　C. HOLLERITH　　　　2,478,580
REMOVABLE FLANGE CONSTRUCTION
Filed April 9, 1945

Inventor
CHARLES HOLLERITH
By Beaman & Lavy
Attorneys

Patented Aug. 9, 1949

2,478,580

UNITED STATES PATENT OFFICE 2,478,580

REMOVABLE FLANGE CONSTRUCTION

Charles Hollerith, Jackson, Mich., assignor, by mesne assignments, to The B. F. Goodrich Company, Akron, Ohio, a corporation of New York Application April 9, 1945, Serial No. 587,401

4 Claims. (Cl. 152—406)

The present invention relates to improvements in removable flange construction on pneumatic tired vehicle wheels, being specifically concerned with a removable tire retaining flange.

One of the objects of the present invention is to provide a split removable flange construction of the type described having improved means for securing the flange in position preventing inadvertent loosening of the flange in the event of tire deflation.

Another object of the invention is to provide a removable tire retaining flange for vehicle wheel structure in which the means for locking the same against removal is located exteriorly of the main body of the wheel and imposed between a portion of the flange and an exterior portion of the wheel body.

A further object of the invention is to provide an improved removable tire retaining flange having a tongue and groove connection with the wheel, axially shiftable inwardly before release with exteriorly located locking means preventing such axial movement.

These and other objects and advantages residing in the construction, arrangement and combination of parts will be more fully treated hereinafter in the specification and appended claims.

Figure 3:
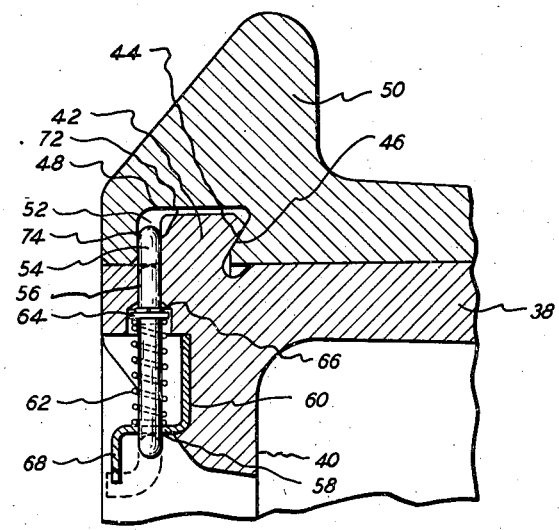

In the drawing,

Fig. 1 is a fragmentary cross-sectional view through a vehicle wheel according to the present invention, Fig. 2 is a view similar to Fig. 1 of a modified form of the invention, and Fig. 3 is a modification of the invention shown in Fig. 1.

In the form of the invention shown in Fig. 1, the wheel structure 10 has a rim portion 12 with integrally cast spoke portions 14 extending inwardly to the hub (not shown). A circumferential groove 16 is provided in the rim 12.

The removable tire retaining flange construction comprises a member 18 which may be in the form of a split ring made up of two or more segmental arcuate sections collectively embracing when in position the entire circumference of the rim 12. The rim member 18 has a tongue 20 so constructed as to be capable of interlocking along the edge 22 with a complementary similarly inclined edge 24 of the rim 12. A tongue 20 is axially movable within the limits of the difference between the relative width of the tongue 20 and the groove 16 in which it is axially slidable.

With the edges 22 and 24 interlocked in the manner shown in Fig. 1 preventing radial displacement of the tongue 20 from the groove 16, axial movement of the tongue 20 in the groove 16 is prevented through a ring member 26 positionable between the shoulder 28 of the flange member 18 and the shoulder 30 of the rim 12. The ring 26 may be in the form of a snap ring or two half rings, as may be desired. Cotter keys 32 circumferentially spaced about and supported in the wheel body 10 may be employed as one simple method of preventing inadvertent displacement of the ring 26 from its locking position shown in Fig. 1. On removal of the ring 26 from between the shoulders 28 and 30, the flange member 18 may be axially displaced to the left, as viewed in Fig. 1, sufficiently to clear the edges 22 and 24 for relative radial displacement.

It will be understood that there is sufficient clearance at 34 to permit axial displacement of the tongue 20 far enough to the left as shown in Fig. 1 to clear the edges 22 and 24 for radial movement.

In the modified form of the invention shown in Fig. 2, the flange member 18' is similar to that shown in Fig. 1 except that the tongue portion 20 is of slightly modified construction as is the rim 12' shaped with a stepped portion 36 in lieu of the circumferential groove 16 shown in Fig. 1. The interlocking engagement between the complementary inclined sides 22' and 24' are the same as shown in Fig. 1, as is the function of the locking ring 26'.

Referring to Fig. 3, the rim 38 of the wheel structure 40 is provided with a circumferential flange 42 having an inclined shoulder 44 adapted to interlock with a complementary inclined shoulder 46 partially defining a circumferential groove 48 in the tire retaining flange 50. With the shoulders 44 and 46 interlocked against radial displacement movement, there is sufficient clearance at 52 to receive the locking pin 54 supported for radial movement in the wheel 40. The pin 54 is guided in a hole 56 in its upper end and by a hole 58 in the stamping 60, suitably secured to the outside of the wheel 40. A spring 62 bears against the stamping 60 at its lower end and against a washer 64 at its upper end. A cotter key 66 is shown employed to enable the washer 64 to take the thrust of the spring 62. The pin 54 is shown provided with a right angle bend 68 providing convenient means for engaging the pin 54 to urge the same in the dotted line position shown and by rotation through 90° to engage with the portion 68 of the stamping 60 to hold the pin 54 in its retracted position shown in dotted outline. With the pin 54 in its retracted position, there is enough clearance between the shoulders 72 and 74 to enable axial relative movement of the flange 50 to the right, shown in Fig. 3, to clear the shoulders 44 and 46 for relative radial movement. As will be readily understood, the plurality of locking pins 54 will be circumferentially spaced around the wheel.

Having thus described my invention, what I desire to secure by Letters Patent and claim is:

1. A vehicle wheel body for supporting a pneumatic tire comprising in combination a wheel body having a main annular rim portion, said main rim portion having a circumferentially extending recess on its exterior surface bounded, adjacent one peripheral edge of the main rim portion, by a circumferentially extending flange, the latter presenting an undercut shoulder at its inner radial side wall remote from said edge, a separately formed and removable tire retaining flange member adapted for engagement with said main rim body, said removable tire retaining flange being composed of segmental arcuate sections formed to encompass the said flange on the main rim body, the said sections having circumferentially extending recesses presenting undercut shoulders complementary to the aforesaid shoulder on the main rim part, and means insertable between the outside wall of said circumferentially extending flange on the main rim part and the corresponding walls of the said recesses remote from the undercut shoulders thereof to bring said undercut shoulders into inter-locked relationship, whereby to prevent said sections from moving radially outwards from the main rim part, the said means, when removed, permitting axial displacement of the said sections relatively to the main rim part and hence removal of the sections from the latter.

2. A vehicle wheel body as claimed in claim 1 wherein said means, insertable between the main rim part and the said sections to prevent radial displacement of the latter, consist of resiliently mounted plunger members carried upon the main rim part so as normally to be projected radially outwards from the latter for engagement at their outer ends in a clearance space formed between the engaged removable tire retaining flange and the main rim portion.

3. A vehicle wheel body for supporting a pneumatic tire comprising in combination a body presenting a main cylindrical rim portion having a circumferentially extending annular recess on its exterior surface bounded, adjacent one peripheral edge of the main rim portion, by a circumferentially extending flange, the latter presenting an undercut shoulder at its inner radial side wall remote from said edge and the said rim portion having a radial opening therein extending from the exterior surface of the rim portion to a recessed interior of said body, a plunger member in said opening, resilient means biasing the plunger radially outwards from the said exterior surface, the plunger being retractable into said recess to clear said surface when required, and a separately formed and removable tire retaining flange member formed to encompass said flange on the rim portion and having a circumferentially extending annular recess presenting an undercut radial shoulder complementary to the aforesaid undercut shoulder on the rim portion and interlocked with the latter by the said plunger, in its outwardly projected condition, being located in a clearance space formed between the engaged removable tire retaining flange and the rim portion, the said plunger, when retracted, permitting axial displacement of the removable tire flange relatively to the main rim portion and the said undercut radial shoulders, when interlocked, preventing relative radial displacement of the said rim portion and tire flange.

4. A vehicle wheel body as claimed in claim 3 wherein said removable tire retaining flange is composed of a plurality of segmental arcuate sections each formed to encompass a portion of said flange on the main rim portion and the latter is provided with a plurality of said plungers disposed in circumferentially spaced relationship for cooperation with the different said sections.

CHARLES HOLLERITH.

REFERENCES CITED

The following references are of record in the file of this patent:

UNITED STATES PATENTS

| Number | Name | Date |
| --- | --- | --- |
| 1,162,216 | Booth | Nov. 30, 1915 |
| 1,516,643 | Paul | Nov. 25, 1924 |
| 1,710,614 | Furrer | Apr. 23, 1929 |
| 2,380,649 | Hollerith | July 31, 1945 |

FOREIGN PATENTS

| Number | Country | Date |
| --- | --- | --- |
| 648,428 | Germany | 1937 |